United States Patent [19]

Scott et al.

[11] Patent Number: 5,122,555

[45] Date of Patent: Jun. 16, 1992

[54] UV-STABILIZATION OF POLYMERS USING NITRO COMPOUNDS

[75] Inventors: Gerald Scott, North Yorks; Sahar Al-Malaika, West-Midlands; Liyanaarachchige M. Keerthi-Tillekratne, Sri Lanka, all of Great Britain

[73] Assignee: Akzo NV, Arnhem, Netherlands

[21] Appl. No.: 562,070

[22] Filed: Aug. 2, 1990

[30] Foreign Application Priority Data

Aug. 7, 1989 [GB] United Kingdom ............... 8917991

[51] Int. Cl.$^5$ ................. C08K 5/3435; C08L 23/36
[52] U.S. Cl. ..................... 524/99; 524/91; 524/103; 524/259; 524/260; 524/336; 525/167; 525/331.5; 525/333.6; 525/377
[58] Field of Search ............ 525/167, 377, 331.5, 525/333.6; 524/259, 260, 99, 103, 336, 91; 526/311; 560/196, 222; 252/401, 405, 404

[56] References Cited

U.S. PATENT DOCUMENTS

| | | | |
|---|---|---|---|
| 2,304,335 | 12/1942 | Campbell | 525/377 |
| 2,365,717 | 12/1944 | Mighton | 560/196 |
| 2,378,169 | 6/1945 | Agre et al. | 560/196 |
| 2,449,804 | 9/1948 | D'Alelio et al. | 560/222 |
| 2,973,241 | 2/1961 | Scott et al. | 525/377 |
| 3,098,039 | 7/1963 | Hodge | 560/196 |
| 3,149,031 | 9/1964 | Stoffel et al. | 560/222 |
| 3,166,529 | 1/1965 | Newland et al. | 524/259 |
| 3,242,040 | 3/1966 | Beaver et al. | 560/196 |
| 3,247,162 | 4/1966 | Newland et al. | 524/259 |
| 3,650,984 | 3/1973 | Jones | 524/236 |
| 3,880,808 | 4/1975 | Hausch et al. | 524/259 |
| 4,007,159 | 2/1977 | Dounchis | 524/260 |
| 4,153,597 | 5/1979 | Wheeler et al. | 524/259 |
| 4,672,088 | 6/1987 | Scott | 524/178 |
| 5,019,615 | 5/1991 | Mizuno et al. | 524/260 |

FOREIGN PATENT DOCUMENTS

| | | |
|---|---|---|
| 0253365 | 1/1988 | European Pat. Off. . |
| 124054 | 2/1977 | German Democratic Rep. . |
| 1003467 | 9/1965 | United Kingdom . |
| 1030629 | 5/1966 | United Kingdom . |
| 2147300 | 5/1985 | United Kingdom . |

OTHER PUBLICATIONS

*The Journal of Applied Polymer Science*, "The Polymerization and Copolymerization of Nitroalkyl Acrylates and Nitroalkyl Methacrylates", vol. 12, pp. 1683-1695 (1968).

*The Journal of Applied Polymer Science*, vol. 33, pp. 703-713, (1987).

*Primary Examiner*—Veronica P. Hoke
*Attorney, Agent, or Firm*—Louis A. Morris; David H. Vickrey

[57] ABSTRACT

Polyolefins are stabilized against UV-deterioration by mixing therewith a hindered C-nitro compound having a molecular weight above 500. In a preferred embodiment the hindered C-nitro compound is a nitrated polyolefin. A conventional UV-stabilizer, such as a substituted benzophenone or a hindered piperidine, may be used in combination with the hindered C-nitro compound.

15 Claims, No Drawings

UV-STABILIZATION OF POLYMERS USING NITRO COMPOUNDS

The invention relates to the stabilization of organic polymers against the influence of UV-radiation.

It is generally known that most organic polymers are subject to photooxidative deterioration. This can lead to an undesirable loss of properties, e.g. embrittlement or discoloration of the polymer. More particularly, polymers are subject to deterioration when, in service, they are in an outdoor environment or otherwise subjected to UV-radiation. To prevent or retard such deterioration it is well known to incorporate so-called stabilizers into organic polymer compositions. Amongst the commercially available UV-stabilizers are substituted benzophenones such as 2-hydroxy-4-octoxy benzophenone and hindered piperidines such as bis(2,2,6,6-tetramethyl-4-piperidinyl) sebacate, which are sold under the names Cyasorb® UV 531 (ex American Cyanamid) and Tinuvin® 770 (ex Ciba Geigy AG), respectively. Such conventional stabilizers are often expensive to prepare and do not always provide the desired stabilizing effect.

It has now been found that organic polymers, in particular polyolefins, such as, polyethylene and polypropylene, may be stabilized against photo-oxidative deterioration by mixing the polyolefin with a hindered C-nitro compound having a low volatility. Preferably said hindered C-nitro compound comprises least one moiety of the formula A:

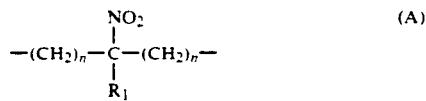

wherein $R_1$ represents hydrogen, a straight or branched, substituted or unsubstituted alkyl group, or a substituted or unsubstituted cycloalkyl group, and n represents an integer of from 1 to 4.

These hindered C-nitro compounds show a higher UV-stabilizing effect than many commercially available UV-stabilizers, and they match up to very effective stabilizers, such as bis(2,2,6,6-tetramethyl-4-piperidinyl) sebacate. The present C-nitro compounds offer the advantage of being easy to prepare.

Some of the hindered C-nitro compounds used according to the invention are known per se, but their use as UV-stabilizers in organic polymers has not been suggested before.

The Journal of Applied Polymer Science Vol. 12 pp. 1683–1693 (1968) discloses certain nitro-alkyl acrylates and methacrylates such as 2-methyl-2-nitro-1,3-propylene diacrylate. In this publication homopolymers and copolymers with styrene were tested as fuel binders of solid rocket propellants. No mention is made of a UV-stabilizing effect for these compounds.

U.S. Pat. No. 4,007,159 discloses hindered phenolic antioxidants, inter alia 2,6-di-t-butyl-4-(2-methyl-2-nitro-propyl) phenol. No mention is made of a UV-stabilizing effect for these compounds.

U.S. Pat. No. 3,650,984 discloses the reaction products of nitroalkanes with organo tin compounds. According to this disclosure, however, the complexes obtained are used in polyvinylhalide resin compositions for stabilization against degradation by heat. No UV-stabilizing effect of these complexes is suggested, and the nitro alkanes themselves merely serve as a starting material.

DD-124 054 discloses the use as light stabilizers of vinylic nitro compounds having the general formula

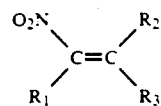

wherein $R_1$, $R_2$ and $R_3$ are chosen from the group of hydrogen or (un)substituted alkyl-, cycloalkyl-, aralkyl-, aryl-, amino-, mercapto-, carbonylalkyl-, carboxy-, aryl- or heterocyclic groups. The essential difference between these compounds and the compounds used according to the present invention resides in the presence of a carbon-carbon double bond, with attendant differences in chemical properties. Besides, the vinylic nitro compounds which are specifically disclosed comprise further functional groups which seem to contribute to the stabilizing effect.

British Patent Application No. 8326238 published as the priority document in the file of British Patent Specification No. 2147300 discloses the use of nitro-t-butane and nitro-tris-hydroxymethyl methane for UV-stabilisation of thermoplastic polymer compositions. However, these low molecular weight nitro compounds are not very effective as UV-stabilizers and suffer from a high volatility thereby causing processing and exudation problems.

Finally, it should be noted that WO 85 01508 discloses C-nitroso compounds, having good UV-stabilizing activity.

The nitroso compounds are less readily available than C-nitro compounds. The stabilizing power of the C-nitroso compounds is attributed to their being capable of forming nitroxyl radicals under polymer processing conditions. The mechanism of the stabilization by nitroxyl radical is the subject of a study in Journal of Applied Polymer Science, Vol. 33, 703–713 (1987).

A preferred embodiment of the present invention is the use of said C-nitro stabilizers in conjunction with conventional stabilizers, particularly when synergism is observed, i.e. the UV-stability of the final product is higher than might be expected on the basis of the summed activities of the individual stabilizers when used alone. A dramatic increase in protection level was demonstrated for synergistic combinations with substituted benzophenones and hindered piperidines. Examples of such conventional UV-stabilizers are 2-hydroxy-4-octoxybenzophenone (Cyasorb® UV 531) and bis(2,2,6,6-tetramethyl-4-piperinidyl) sebacate (Tinuvin® 770).

In choosing the stabilizer in a process according to the present invention, the physical properties of the stabilizer must be taken into consideration. For example, loss of stabilizer by evaporation or extraction, necessitating the use of increasing amounts of stabilizer for proper protection, should be avoided. Also, the health risks run by the workers involved in polymer processing should be minimized.

Compounds for use according to the invention and comprising the UV stabilizer active moiety A have a relatively low volatility. In this respect most of the preferred compounds have a molecular weight of above 250, and preferably higher than 500. Such a high molecular weight structure may comprise a plurality of C- nitro groups and may be an oligomer or a polymer of monomers comprising the moiety A or oligo- or polycondensation products of monomers comprising the moiety A carrying two functional groups active in polycondensation reactions.

Alternatively, the moiety A may be grafted onto the organic polymer to be UV stabilized. To accomplish this, a graftable functionality may be attached to the moiety A, and the functional compound including the moiety A, for example acryloxy-2-nitro-2-methylpropane may be grafted onto the backbone of a polymer by the use of free radical initiators. This is expediently done by masterbatch techniques, whereby a stabilizer concentrate is prepared under conditions adaptable to the half-life of the free-radical initiator and immobilized UV stabilizer concentrates are obtained which can be merchandized for safe processing with further polymers.

According to a further approach contemplated by the invention, the essential hindered C-nitro group is introduced into prepolymerized structures, for example by nitrating hydrocarbon polymers having tertiary carbon substitution. As highly preferred examples, polypropylene and polyethylene are mentioned, which upon nitration, provide a masterbatch concentrate of a stabilizer comprising hindered C-nitro groups which is particularly compatible with, and useful for, the stabilization of unmodified polypropylene or polyethylene.

Suitable hindered C-nitro compounds for use according to the invention are derived from readily available low molecular weight compounds comprising the moiety A and having attached thereto a reactive group or a leaving group such as a hydroxy, a carboxyl or a chloro group.

Such suitable compounds are 2-methyl-2-nitro propanol,
2-methyl-2-nitro butanol-1,3-methyl-3-nitro pentanol-1,
2-methyl-2-nitro propanoic acid, 2-methyl-2-nitro propanediol-1,3,
2-methyl-2-nitro butanediol-1,4,2-cyclohexyl 2-nitro propanediol-1,3.

Preferred are derivates of the above compounds having a low volatility. Such a preferred class of hindered C-nitro compounds for use according to the invention comprises esters of the mono- or dihydroxy tertiary-nitroalkanes with mono- or di-carboxylic acids, i.e. compounds comprising at least one moiety B:

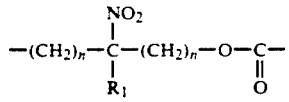
(B)

wherein $R_1$ and n have the meanings as mentioned hereinbefore.

These esters may have one of the formulae (I) to (IV)

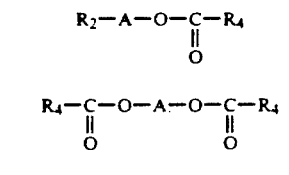

(I)

(II)

(III)

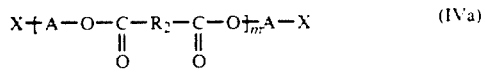
(IVa)

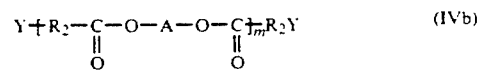
(IVb)

wherein A is as defined hereinbefore, $R_2$ is $C_1$ to $C_6$ alkylene, $C_2$ to $C_6$ alkenylene or phenylene, $R_3$ is a hydroxy group, hydrogen, or a substituted or unsubstituted aliphatic or aromatic group, $R_4$ is a substituted or unsubstituted aliphatic or aromatic group, X is hydrogen or a hydroxy group, Y is hydrogen or a carboxy group, and $m = 1-100$.

Representative examples are bis(2-nitro-2-methylpropyl)succinate, bis(2-nitro-2-methylpropyl)adipate, 2-nitro-2-methylpropylstearate, and 1,3-bis-stearoyloxy-2-methyl-2-nitropropane.

Most preferred are the compounds of formulae (IVa) and (IVb) which are obtainable from the polycondensation reaction of a dihydroxy-t-nitroalkane and a diacid, such as alkanedioic, alkenedioic and benzene dicarboxylic acids. The degree of oligo- or polycondensation most desirable for compatability with the UV-stabilizable polymers can readily be controlled by varying the ratio of dihydroxy compound to dicarboxylic acid compound or by addition of minor amounts of monohydroxy or monocarboxy compounds.

Representative examples are bis(2-nitro-2-methylpropyl)disuccinate oligomer, bis(2-nitro-2-methylpropyl) diadipate oligomer and bis(2-nitro-2-methylpropyl) diisophthalate oligomer.

Another class of derivatives is constituted by esters of a tertiary C-nitro hydroxy or carboxy compound and ethylenically unsaturated carboxy or hydroxy compound. Preferably these compounds have the formula:

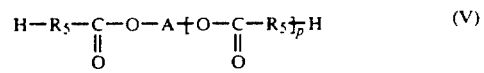
(V)

wherein A is as defined hereinbefore, $R_5$ is $C_{1-6}$-alkenylene and $p = 0$ or 1.

Examples of such compounds are 1-acryloyloxy-2-nitro-2-methyl-propane, 1-methacryloyloxy-2-nitro-2-methyl-propane, and 1,3-bis-acryloyloxy-2-nitro-2-methylpropane. These compounds are useful for preparing non-blooming UV stabilized polymer compositions. The compounds of formula V may be addition copolymerised with another ethylenically unsaturated monomer to provide a polymeric stabilizer of any desired molecular weight. When graftable polymers are to be stabilized, the compounds of formula V may be incorporated into the polymer composition and grafted onto the polymer backbone under graft polymerization conditions, optionally using free radical initiators.

A further class of compounds for use according to the invention is constituted by nitrated polymers. Preferred substrate polymers are those polymers liable to tertiary carbon substitution, in particular, polymers or (co)-polymers of propylene. The predominant substitution at the tertiary C-atoms along the polymer chain provides the required hindrance of the nitro-groups. Nitrated polyethylene also exhibited the UV-stabilizing effect according to the invention. The nitrated polymers, such as nitrated polypropylene, are inherently non-volatile and usually compatible with the unmodified polymers. When use is made of masterbatch techniques, highly nitrated polymers may be prepared, which may be mixed into the polymer to be UV stabilized at the desired concentration.

The UV-stabilizers according to the present invention can be obtained by methods known for analogous compounds. For example they may be obtained as follows.

The low molecular weight nitroalkanes are commercially available or may be prepared by standard methods. Succinated nitro compounds such as bis(2-nitro-2-methylpropyl) succinate (NMPS) and bis(2-nitro-2-methylpropyl) disuccinate oligomer (NMPDS) may be prepared by esterification of the related acid using a nitro-alcohol.

Acrylated nitro compounds such as acryloyloxy-2-nitro-2-methylpropane (ANMP) 1,3-bis-acryloyloxy-2-nitro-2-methylpropane (BANMP) and 1,3-bis-acryloxy-2-acryloyloxymethyl-2-nitropropane may be obtained by reaction of acryloylchloride with the respective alcohol in the presence of a base. The nitrated polymers are obtained by nitration of the parent polymers.

The organic polymers to be stabilized by using stabilizers according to the present invention are those polymers which contain carbon, hydrogen, oxygen and/or nitrogen. Examples include the thermoplastic polymers such as polyolefin homopolymers and copolymers, rubber modified polyolefins, polystyrene, rubber modified polystyrene, polyvinylchloride, polyamides, polyesters, and acrylonitrile-butadiene-styrene. Mixtures or blends of polymers may also be grafted. The polymers will normally have a high molecular weight so that they are suitable for film or fiber forming purposes, although low molecular weight polymers and even liquid polymers may be grafted especially when the adducts are to be used as masterbatch additives to other polymers. It is not necessary for the polymer itself to contain unsaturated groups, although polymer substrates containing unsaturation may be employed. In the case of a masterbatch it is particularly preferable to employ saturated polymers to form the masterbatch concentrate.

In the commercial formulation of polymer compositions, the processing times are often dependent on the residence time in the apparatus used. It may therefore be advantageous to produce a masterbatch composition of stabilizer according to the invention having a high content of stabilizer. This masterbatch may be obtained under processing conditions which ensure that optimum stabilization is obtained and then may be used as additive to an organic polymer in a conventional extruder or injection moulding machine. The masterbatch may with advantage also contain additional radical initiators.

The stabilizers according to the present invention are generally used in an amount of up to 3% by weight of the organic polymer composition. The preferred range is usually 0.05 g to 0.5 g stabilizer per 100 g of polymer. In the case of the masterbatches, however, the concentration of stabilizer will be considerably greater, for example between 10 and 50% by weight of the organic polymer.

The following examples illustrate the invention.

EXAMPLE 1

Synergistic UV-stabilizing effect of bis(2-nitro-2-methylpropyl)discuccinate and a commercial UV-stabilizer in polypropylene. Bis(2-nitro-2-methylpropyl)succinate was obtained by esterification of succinic acid using 2-nitro-2-methylpropan-2-ol.

The conventional UV-stabilizers used were 2-hydroxy-4-octoxybenzophenone (Cysorb® UV 531) and bis(2,2,6,6-tetramethyl-4-piperinidyl)sebacate (Tinuvin® 770).

The nitro esters produced as outlined above were mixed with polypropylene powder (HF-26) supplied by ICI Plastics Division Limited and processed in a Brabender torque rheometer at 190° C.

Before each processing operation the pre-weighed additive was tumble mixed with 35 g of polypropylene and then charged into the mixing chamber of the torque rheometer. The chamber was closed by means of a pneumatic ram and the processing operation was allowed to last for 10 minutes. On completion of the processing operation, the samples were rapidly removed and quenched in cold water to prevent thermal oxidation.

The processed samples were compression moulded at 180° C. into films 0.2 mm thick using a special grade of cellophane as mould release agent. Irradiation of the polymer films was carried out in a UV-exposure cabinet with a mean intensity on the order of 4.6 $Whm^{-2}$, which is close to the limiting outdoor value.

Embrittlement times of UV-exposed films were determined by noting the time required for a film to break when flexed manually through 180° C. The results obtained were as follows.

TABLE I

Synergistic UV-stabilizing effect of 2-nitro-2-methylpropyl-succinate (NMPS) and the conventional UV-stabilizers 2-hydroxy-4-octoxybenzophenone (UV 531) and bis(2,2,6,6-tetramethyl-4-piperinidyl)sebacate (Tinuvin 770) in polypropylene. All amounts are in % by weight.

| NMPS | UV 531 | Tinuvin 770 | Elapsed Time (hr) |
|---|---|---|---|
| 0.2 | — | — | 620 |
| 0.4 | — | — | 960 |
| — | 0.2 | — | 450 |
| — | 0.4 | — | 760 |
| — | — | 0.2 | 650 |
| — | — | 0.4 | 1250 |
| 0.1 | 0.3 | — | 2500 |
| 0.2 | 0.2 | — | 2300 |
| 0.3 | 0.1 | — | 1500 |
| 0.1 | — | 0.3 | 2200 |
| 0.2 | — | 0.2 | 1500 |
| 0.3 | — | 0.1 | 1280 |

The above results show that the performance of the C-nitro compound used according to the invention equals that of UV 531 and at economic levels that of Tinuvin 770. The synergistic combinations of NMPS with either of the two commercial stabilizers show a much higher protection level than any of the individual stabilizers at the 0.4% by weight level.

TABLE II

Synergistic UV-stabilizing effect of bis(2-nitro-2-methylpropyl) disuccinate oligomer (NMPDS) and the conventional UV-stabilizers 2-hydroxy-4-octoxybenzophenone (UV 531) and bis(2,2,6,6-tetramethyl-4-piperinidyl) sebacate (Tinuvin 770) in polypropylene. All amounts are given in weight percent.

| NMPS | UV 531 | Tinuvin 770 | Elapsed Time (hr) |
|---|---|---|---|
| 0.2 | — | — | 700 |
| 0.4 | — | — | 840 |
| 0.1 | 0.3 | — | 1950 |
| 0.2 | 0.2 | — | 2250 |
| 0.3 | 0.1 | — | 1300 |
| 0.1 | — | 0.3 | 1950 |

TABLE II-continued

Synergistic UV-stabilizing effect of bis(2-nitro-2-methylpropyl) disuccinate oligomer (NMPDS) and the conventional UV-stabilizers 2-hydroxy-4-octoxybenzophenone (UV 531) and bis(2,2,6,6-tetramethyl-4-piperinidyl) sebacate (Tinuvin 770) in polypropylene. All amounts are given in weight percent.

| NMPS | UV 531 | Tinuvin 770 | Elapsed Time (hr) |
|---|---|---|---|
| 0.3 | — | 0.1 | 1250 |

EXAMPLE 2

Grafting of nitroacrylates onto polypropylene

The nitroacrylates acryloyloxy-2-nitro-2-methylpropane (ANMP) and 1,3-bisacryloyloxy-2-nitro-2-methylpropane (BANMP) were obtained by reaction of acryloyl-chloride with the respective alcohol in the presence of a base. Melt grafting of these nitroacrylates was carried out by processing a 5% masterbatch of each additive in polypropylene for 10 minutes using a Brabender torque rheometer at 190° C. The radical initiator dicumyl peroxide (at various additive/peroxide ratios) also served to optimize the grafting efficiency of the additive. The diluted masterbatch was obtained by mixing the above (1 part) with 10 parts of unstabilised polypropylene.

The processed samples were moulded as described in Example 2. The UV-stabilizing effect was studied with and without solvent extraction of the polymer. The grafting efficiency of the nitroacrylate masterbatches after exhaustive extraction with methylene chloride of the compression-moulded polymer fibres (0.2 mm thickness) was measured by Fourier Transform infra red (FTIR) spectroscopy (Perk Elmer). Grafting efficiency was determined by following changes in the absorption intensity of the functional groups, firstly before extraction (C=C), and then at time intervals during extraction (C=O, —NO₂).

The results obtained are as follows.

TABLE III

Grafting of nitroacrylates onto polypropylene

| | % grafted | Elapsed Time (hr) unextracted | extracted |
|---|---|---|---|
| Unstabilized PP | — | 90 | — |
| ANMP | 3.2 | 290 | 180 |
| ANMP + 1% DCP | 94.6 | 220 | 300 |
| BANMP | 38.4 | 860 | 660 |
| BANMP + 1% DCP | 100 | 500 | 820 |

Remarks on Table III

ANMP and BANMP have been evaluated with and without dicumyl peroxide to study the effect of improved grafting particularly on retention of properties after solvent extraction of the polymer. This was again measured by the time required for a film to break when flexed manually through 180° C. The choice of peroxide was not optimal as indicated by the large difference between stabilisation before and after extraction. This is due to a photodegradant—acetophenone—being formed as a byproduct from the peroxide.

EXAMPLE 3

The use of diluted masterbatches.

TABLE IV

Grafting of nitroacrylates onto polypropylene by using a diluted masterbatch

| | Elapsed Time (hr) |
|---|---|
| UV 531 (0.4%) | 760 |
| Tin 770 (0.4%) | 1250 |
| ANMP | 500 |
| ANMP + 1% DCP | 750 |
| BANMP | 590 |
| BANMP + 1% DCP | 750 |

EXAMPLE 4

Polypropylene and polyethylene were nitrated using a nitric acid and sulphuric acid in a chlorobenzene solution. The nitrated polypropylene contained 1.5 g NO₂/100 g of polymer. This masterbatch was mixed with unstabilized polypropylene in a 1:10 weight ratio. For comparison the commercial stabilizers of the preceeding Examples were also incorporated at levels of 0.05, 0.10 and 0.25 phr. As appears from Table V, the nitrated propylene is an effective stabilizer, and moreover a synergistic effect is shown.

TABLE V

Embrittlementtimes (ET) of P.P. films containing nitratedpolypropylene* (NPP)

| UV 531 | NPP | Tinuvin 770 | Elapsed Time (hr) |
|---|---|---|---|
| 0.05 | — | — | 225 |
| 0.10 | — | — | 834 |
| 0.25 | — | — | 720 |
| — | 0.15 | — | 660 |
| 0.05 | 0.15 | — | 973 |
| 0.10 | 0.15 | — | 1510 |
| 0.20 | 0.15 | — | >1600 |
| 0.25 | 0.15 | — | >1600 |
| — | — | 0.05 | 461 |
| — | — | 0.1 | 600 |
| — | — | 0.2 | 800 |

*Masterbatch containing 1.5 g NO₂/100 g reduced to 0.15 g NO₂/100 g in unstabilised PP.

We claim:

1. A process for UV-stabilizing polyolefins by mixing the polyolefin with an effective amount of a C-hindered nitro compound having a molecular weight above 250, with the proviso that the hindered C-nitro compound is not a phenol, wherein said hindered C-nitro compound comprises at least one moiety of formula A

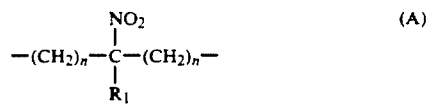

(A)

wherein R₁ is selected from the group consisting of hydrogen, straight and branched, substituted and unsubstituted alkyl groups and substituted and unsubstituted cycloalkyl groups, and n represents an integer of from 1 to 4.

2. A process according to claim 1 wherein the hindered C-nitro compound comprises at least one moiety of formula B

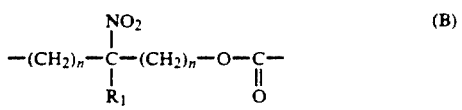

(B)

wherein $R_1$ is selected from the group consisting of hydrogen, straight and branched, substituted and unsubstituted alkyl groups and substituted and unsubstituted cycloalkyl groups, and n represents an integer of from 1 to 4.

3. A process according to claim 2 wherein the hindered C-nitro compound has the formula IVa or IVb

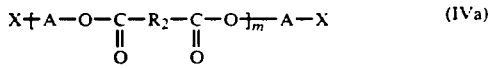 (IVa)

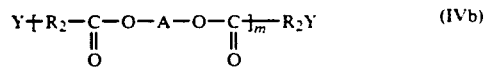 (IVb)

wherein A is of the formula

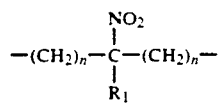

wherein $R_1$ is selected from the group consisting of hydrogen, straight and branched, substituted and unsubstituted alkyl groups and substituted and unsubstituted cycloalkyl groups, n represents an integer of from 1 to 4, $R_2$ is selected from the group consisting of $C_1$ to $C_6$ alkylene, $C_2$ to $C_6$ alkenylene and phenylene, X is selected from the group consisting of hydrogen and hydroxy, Y is selected from the group consisting of hydrogen and carboxy and $m = 2-100$.

4. A process according to claim 3 wherein the hindered C-nitro compound has the formula V

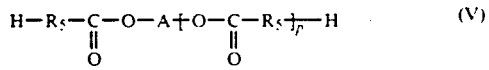 (V)

wherein A is of the formula

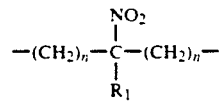

wherein $R_1$ is selected from the group consisting of hydrogen, straight and branched, substituted and unsubstituted alkyl groups and substituted and unsubstituted cycloalkyl groups, n represents an integer of from 1 to 4, $R_2$ is selected from the group consisting of $C_1$ to $C_6$ alkylene, $C_2$ to $C_6$ alkenylene and phenylene, $R_5$ is an alkenylene and $p = 0$ or 1.

5. A process according to claim 1 wherein the hindered C-nitro compound is a nitrated polyolefin.

6. A process according to claim 1 wherein the hindered C-nitro compound is added in combination with a synergistically effective amount of at least one conventional UV-stabilizer.

7. A process according to claim 5 wherein the hindered C-nitro compound is added in combination with a synergistically effective amount of at least one conventional UV-stabilizer.

8. A process according to claim 6 wherein said conventional UV-stabilizer is selected from the group of substituted benzophenones and hindered piperidines.

9. A process according to claim 7 wherein said conventional UV-stabilizer is selected from the group of substituted benzophenones and hindered piperidines.

10. A process according to claim 1 wherein the hindered C-nitro compound has a molecular weight above 500.

11. A stabilizer concentrate useful for UV-stabilizing polyolefins by masterbatch techniques, said stabilizer concentrate comprised of a conventional UV-stabilizer and a polymer containing from 10 to 50 wt. % of a hindered C-nitro compound having a molecular weight above 250, with the proviso that the hindered C-nitro compound is not a phenol, wherein said hindered C-nitro compound comprises at least one moiety of formula A

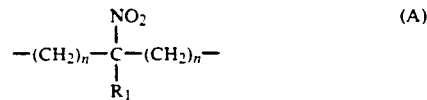 (A)

wherein $R_1$ is selected from the group consisting of hydrogen, straight and branched, substituted and unsubstituted alkyl groups and substituted and unsubstituted cycloalkyl groups and n represents an integer of from 1 to 4.

12. A stabilizer concentrate of claim 11 wherein said conventional UV-stabilizer is selected from the group of substituted benzophenones and hindered piperidines.

13. A stabilizer concentrate useful for UV-stabilizing polyolefins by masterbatch techniques, said stabilizer concentrate comprised of a polymer containing 10 to 50 wt. % of a hindered C-nitro compound, said hindered C-nitro compound being a nitrated polyolefin having a molecular weight above 250, with the proviso that the hindered C-nitro compound is not a phenol, wherein said hindered C-nitro compound comprises at least one moiety of formula A

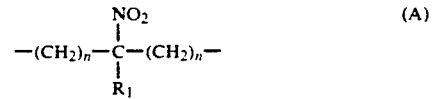 (A)

wherein $R_1$ is selected from the group consisting of hydrogen, straight and branched, substituted and unsubstituted alkyl groups and substituted and unsubstituted cycloalkyl groups, and n represents an integer of from 1 to 4.

14. A stabilizer concentrate of claim 13 further comprising a conventional UV-stabilizer.

15. A stabilizer concentrate of claim 14 wherein said conventional UV-stabilizer is selected from the group of substituted benzophenones and hindered piperidines.

* * * * *